United States Patent
Chen et al.

(10) Patent No.: US 10,389,933 B2
(45) Date of Patent: Aug. 20, 2019

(54) DYNAMIC PANORAMIC IMAGE PARAMETER ADJUSTMENT SYSTEM AND METHOD THEREOF

(71) Applicant: APPRO PHOTOELECTRON INC., New Taipei (TW)

(72) Inventors: I-Wen Chen, New Taipei (TW); Chung-Chin Liu, New Taipei (TW)

(73) Assignee: Appro Photoelectron Inc., New Taipei (TW)

( * ) Notice: Subject to any disclaimer, the term of this patent is extended or adjusted under 35 U.S.C. 154(b) by 27 days.

(21) Appl. No.: 15/864,407

(22) Filed: Jan. 8, 2018

(65) Prior Publication Data

US 2019/0141235 A1  May 9, 2019

(30) Foreign Application Priority Data

Nov. 8, 2017  (TW) .............................. 106138616 A

(51) Int. Cl.
*H04N 5/232* (2006.01)
*H04N 5/265* (2006.01)

(52) U.S. Cl.
CPC ..... *H04N 5/23216* (2013.01); *H04N 5/23293* (2013.01); *H04N 5/265* (2013.01)

(58) Field of Classification Search
CPC .. H04N 5/262; H04N 5/23216; H04N 5/2621; H04N 5/23229
See application file for complete search history.

(56) References Cited

U.S. PATENT DOCUMENTS

| | | | | |
|---|---|---|---|---|
| 2003/0122845 A1* | 7/2003 | Lee | .......................... | H04N 9/77 345/589 |
| 2006/0056733 A1* | 3/2006 | Minakuti | ............... | H04N 5/765 382/286 |
| 2008/0122949 A1* | 5/2008 | Kindborg | ......... | G08B 13/19671 348/231.99 |
| 2012/0050565 A1* | 3/2012 | Imai | ................... | H04N 5/23293 348/224.1 |
| 2012/0188344 A1* | 7/2012 | Imai | ...................... | H04N 5/232 348/47 |
| 2012/0249728 A1* | 10/2012 | Kato | .................... | H04N 1/3871 348/36 |

(Continued)

*Primary Examiner* — Abdelaaziz Tissire
(74) *Attorney, Agent, or Firm* — Muncy, Geissler, Olds & Lowe, P.C.

(57) ABSTRACT

A dynamic panoramic image parameter adjustment system and a method thereof are provided. The dynamic panoramic image parameter adjustment system includes a plurality of image capture elements and a parameter processing module. Firstly, a plurality of first images is captured by the image capture elements at a first time point. A plurality of first parameter setting values corresponding to the image capture elements are extracted by the parameter processing module. The parameter processing module calculates element compensation values based on the first parameter setting values and the target setting values, and compensates the first parameter setting values by using the element compensation values to form the second parameter setting values. Finally, the first parameter setting values are adjusted as the second parameter setting values at a second time point and a plurality of second images for forming a dynamic panoramic image together with the first images are captured.

13 Claims, 6 Drawing Sheets

(56) References Cited

U.S. PATENT DOCUMENTS

| | | | |
|---|---|---|---|
| 2013/0077890 A1* | 3/2013 | Chen | G06T 5/002 382/275 |
| 2013/0089262 A1* | 4/2013 | Chen | G06T 5/002 382/218 |
| 2014/0375759 A1* | 12/2014 | Mikes | H04N 5/23238 348/36 |
| 2015/0085159 A1* | 3/2015 | Sinha | H04N 1/3871 348/231.6 |
| 2017/0272644 A1* | 9/2017 | Chou | H04N 5/23212 |

* cited by examiner

DYNAMIC PANORAMIC IMAGE PARAMETER ADJUSTMENT SYSTEM AND METHOD THEREOF

This application claims the benefit of Taiwan Patent Application Serial No. 106138616, filed Nov. 8, 2017, the subject matter of which is incorporated herein by reference.

BACKGROUND OF INVENTION

1. Field of the Invention

The present invention is related to an image parameter adjustment system and a method thereof, and more particularly is related to a dynamic panoramic image parameter adjustment system, which adjusts the dynamic panoramic image and compensates the element parameter based on the element compensation value, and a method thereof.

2. Description of the Prior Art

In the mid-to-late 20th century, Kodak developed the first digital camera. The vigorous growth of the semiconductor industry in recent years accelerates the development of the charge coupled device (CCD), which boosts the digital camera industry to replace the traditional camera using camera film as the image storage medium.

In addition, in order to shoot the dynamic images, it is common to use the image capture device to capture a great amount of images in a short time and stitch the images in time sequence to form the dynamic image. Moreover, in order to shoot the panoramic image, it is common to use the image capture devices to capture the images of every shooting angles at the same time and stitch the images based on the shooting angles to form the panoramic image.

If the user wants to shoot a dynamic panoramic image, it is common to shoot the panoramic images first and then stitch a great amount of panoramic images in time sequence to form the dynamic panoramic image. However, because the light source or brightness varies with respect to the shooting angles of each of the image capture devices, the images captured by the image capture devices may have different image parameters.

Because the images captured by each of the image capture devices have different image parameters, when doing panoramic image stitching, the only way is to adjust the image parameter of each of the images of each panoramic image by using the algorithm embedded in the image processor or an external software, to have the stitched panoramic images showing consistent appearance.

Although the embedded algorithm or the external software is capable to have the panoramic images showing consistent appearance, it cannot recover the image detail which was not shot by the image capture device. For example, if an over-exposed image was taken by the image capture device such that some image details are missed. The image processor may reduce the brightness of the image but cannot show the details missed in the original image because of over-exposure. Thus, the dynamic panoramic image generated by stitching a plurality of images may have the problem of failing to show the image details completely.

SUMMARY OF THE INVENTION

Because the prior art technology adjusts the image parameters used in post-production for the image captured by the image capture device by using an algorithm embedded in the image processor or an external software, the generated panoramic image cannot show the image details which are missed in the original image.

In order to resolve the aforementioned problem, a dynamic panoramic image parameter adjustment system is provided in accordance with the present invention. The dynamic panoramic image parameter adjustment system includes a plurality of image capture elements and a parameter processing module. The image capture elements are corresponding to a plurality of element parameters respectively, and utilized for capturing a plurality of first images at a first time point in a consecutive time period. Each first image has an image parameter. At the first time point, the element parameters are a plurality of first parameter setting values corresponding to the image parameters of the first images.

The parameter processing module is electrically connected to the image capture elements. The parameter processing module is utilized for calculating a plurality of element compensation values with respective to the image capture devices respectively based on the first parameter setting values of the image capture elements and a plurality of target setting values within a target setting range on a basis of a set reference value so as to compensate the first parameter setting value by using the element compensation values respectively to form a plurality of second parameter setting values, and generating a plurality of parameter control signals for controlling the image capture elements respectively based on the second parameter setting values.

Wherein, as the image capture elements receive the parameter control signals, the image capture elements use the second parameter setting values as the element parameters at a second time point in the consecutive time period which is later than the first time point, and capture a plurality of second images for forming a dynamic panoramic image within the consecutive time period together with the first images.

In accordance with an embodiment of the dynamic panoramic image parameter adjustment system of the present invention, the parameter processing module generates the element compensation values by multiplying a difference between the target setting value and the first parameter setting value and an adjusting ratio, so as to compensate the first parameter setting values by using the element compensation values to form the second parameter setting values.

In accordance with an embodiment of the dynamic panoramic image parameter adjustment system of the present invention, the reference target setting value is a middle value of the target setting range.

In accordance with an embodiment of the dynamic panoramic image parameter adjustment system of the present invention, the parameter processing module generates the element compensation values by multiplying a difference between the target setting value and an average value of the first parameter setting values and an adjusting ratio, so as to compensate the first parameter setting values by using the element compensation values to form the second parameter setting values.

In accordance with an embodiment of the dynamic panoramic image parameter adjustment system of the present invention, the dynamic panoramic image parameter adjustment system further comprises an image processing module. The image processing module is electrically connected to the image capture elements for receiving the first images and the second images, so as to form a first panoramic image at the first time point by using the first images and a second panoramic image at the second time point by using the second images respectively, and forming the dynamic panoramic image according to the first panoramic image and the second panoramic image.

In accordance with an embodiment of the dynamic panoramic image parameter adjustment system of the present invention, the parameter processing module comprises a plurality of parameter transmitting units and a parameter processing unit. The parameter transmitting units are electrically connected to the image capture elements respectively for capturing the first parameter setting values. The parameter processing unit is electrically connected to the parameter transmitting units for calculating the element compensation values according to the first parameter setting values and the target setting values, so as to compensate the first parameter setting values by using the element compensation values to form the second parameter setting values, and generating the parameter control signals according to the second parameter setting values.

In accordance with an embodiment of the dynamic panoramic image parameter adjustment system of the present invention, the element parameter is an image brightness parameter including a result of an exposure shutter value and gain values, an image saturation parameter, image white balance parameters, an image contrast parameter, or an image sharpness parameter.

In accordance with an embodiment of the dynamic panoramic image parameter adjustment system of the present invention, each of the image capture elements is a complementary metal-oxide-semiconductor (CMOS) image capture element.

In order to resolve the aforementioned problem, a dynamic panoramic image parameter adjustment method is also provided in accordance with the present invention. Firstly, the first images and the first parameter setting values corresponding to the image parameters of the first images respectively are captured at the first time point. Then, the element compensation values are calculated according to the first parameter setting values and the target setting values, and the first parameter setting values are compensated by using the element compensation values to form the second parameter setting values. Afterward, the second parameter setting values are set as the element parameters at the second time point, and the second images are captured for forming the dynamic panoramic image together with the first images.

In accordance with an embodiment of the dynamic panoramic image parameter adjustment method of the present invention, the step for calculating the element compensation values by using the first parameter setting values and the target setting value is to multiply a difference between the target setting value and the first parameter setting value and an adjusting ratio to generate the element compensation values, and compensate the first parameter setting values by using the element compensation values to form the second parameter setting values.

As mentioned above, the parameter processing module of the dynamic panoramic image parameter adjustment system and the method thereof provided in the present invention generates the parameter control signals according to the first parameter setting values and the target setting value so as to adjust the element parameters of the image capture elements to have the image capture elements capture the second images which are utilized for generating the dynamic panoramic image together with first images at the second time point based on the second parameter setting values.

In compared with the prior art, because the dynamic panoramic image parameter adjustment system and the method thereof provided in the present invention adjust the image capture elements and the parameter processing module to capture clear images rather than adjust the captured images in post-production, the dynamic panoramic image parameter adjustment system and the method thereof may improve the condition with vague portions generated on the dynamic panoramic image.

In addition, since the image processing module adjusts the device parameters by multiplying the adjustment ratio by the difference between the target value and the first parameter setting value of the image capture device. Therefore, the second parameter setting value gradually approaches the set target value in the target setting range to avoid the image parameter of the second image from changing too much, so it also avoids the discomfort or discontinuity of the user's feeling when watching the dynamic panoramic image.

BRIEF DESCRIPTION OF THE DRAWINGS

The present invention will now be specified with reference to its preferred embodiment illustrated in the drawings, in which.

DESCRIPTION OF THE PREFERRED EMBODIMENT

Figure 1:
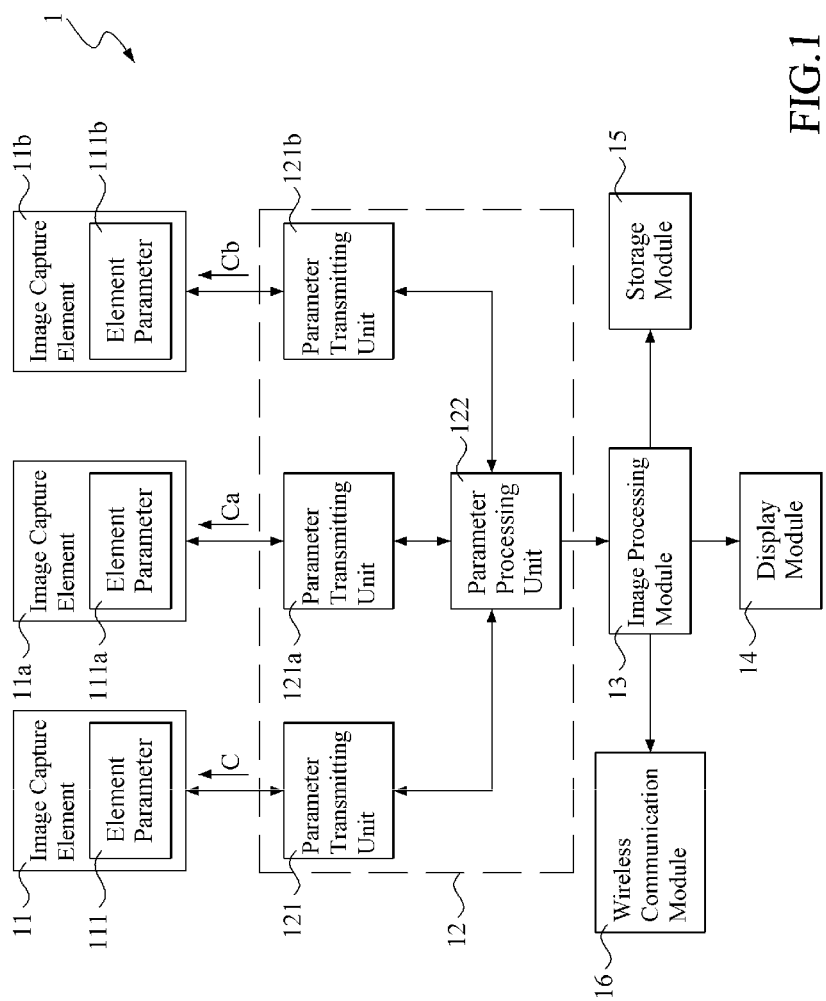
FIG. 1 is a block diagram of the dynamic panoramic image parameter adjustment system provided in accordance with a first embodiment of the present invention.

FIG. 1 is a block diagram of the dynamic panoramic image parameter adjustment system provided in accordance with a first embodiment of the present invention. As shown, the first embodiment of the present invention provides a dynamic panoramic image parameter adjustment system 1, which includes three image capture elements 11, 11a, 11b (three image capture elements are shown in the present embodiment as an example, but the present invention should not be limited thereto), a parameter processing module 12, an image processing device 13, a display module 14, a storage module 15, and a wireless communication module 16.

The image capture elements 11, 11a, 11b have three element parameters 111, 111a, 111b corresponding to the image capture elements 11, 11a, 11b respectively. In the present embodiment, the image capture elements 11, 11a, 11b are complementary metal-oxide semiconductor (CMOS) image capture elements, but the present invention should not be limited thereto. For example, in the other embodiments, the image capture elements 111, 11a, 11b can be the charge-coupled device (CCD) image capture elements or the other available image capture elements.

The parameter processing module 12 includes a plurality of parameter transmitting units 121, 121a, 121b (three parameter transmitting units are shown in the present embodiment, but the present invention should not be limited thereto) and a parameter processing unit 122. The parameter transmitting units 121, 121a, 121b are electrically connected to the image capture elements 11, 11a, 11b, and the parameter processing unit 122 is electrically connected to the parameter transmitting units 121, 121a, 121b. In the present embodiment, the parameter processing module 12 can be an image signal processor (ISP), but the present invention should not be limited thereto. For example, in the other embodiments, the parameter processing module 12 a microcontroller unit (MCU), a graphic processing unit (GPU), a central processing unit (CPU) or a digital signal processor (DSP).

In the present embodiment, the parameter processing module 12 is an image signal processor (ISP) which modularizes the parameter transmitting units 121, 121a, 121b and the parameter processing unit 122, for capturing, setting, and calculating the element parameters 111, 111a, 111b, but the present invention should not be limited thereto. For example, in the other embodiments, the parameter processing module 12 may further integrates the image processing module 13 as a module to incorporate the image processing function of the image processing module 13. In addition, the parameter transmitting units 121, 121a, 121b and the parameter processing unit 122 may operate independently. In this situation, the parameter transmitting units 121, 121a, 121b are utilized for capturing and transmitting the element parameters 111, 111a, 111b to the parameter processing unit 122, and transmitting the calculated result back to the image capture elements 11, 11a, 11b after the element parameters 111, 111a, 111b are calculated by the parameter processing unit 122. In addition, the parameter transmitting units 121, 121a, 121b may be embedded in the image capture elements 11, 11a, 11b respectively.

The image processing module 13 is electrically connected to the parameter processing module 12 in the present embodiment, but the image processing module 13 may be electrically connected to the image capture elements 11, 11a, 11b directly in the other embodiments. In the present embodiment, the image processing module 13 can be a cell phone, an image processing device, a computer, a microcontroller unit (MCU), a graphic processing unit (GPU), a central processing unit (CPU) or a digital signal processor (DSP), but the present invention is not limited thereto.

The display module 14 is electrically connected to the image processing module 13. In the present embodiment, the display module 14 can be an organic electroluminescence display (OLED), a projection display, a light emitted diode (LED) display or a liquid crystal display (LCD), but the present invention is not limited thereto. The storage module 15 is electrically connected to the image processing module 13. In the present embodiment, the storage module 15 can be a hard disk drive, a solid-state disk or a flash memory, but the present invention is not limited thereto. The wireless communication module 16 is electrically connected to the image processing module 13. In the present embodiment, the wireless communication module 16 can be a ZigBee communication module, an EnOcean communication module, a Bluetooth communication module, a 3G/4G communication module, or a Wi-Fi communication module, but the present invention is not limited thereto.

Figure 2:
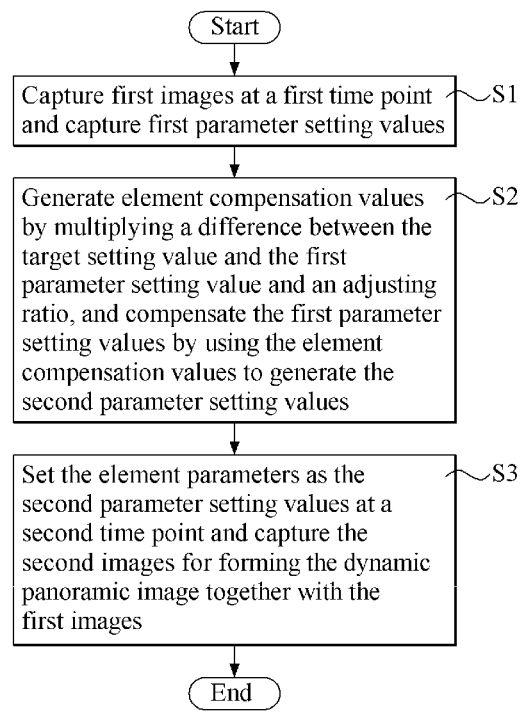
FIG. 2 is a flow chart showing the dynamic panoramic image parameter adjustment method provided in accordance with the first embodiment of the present invention.
Figure 3:
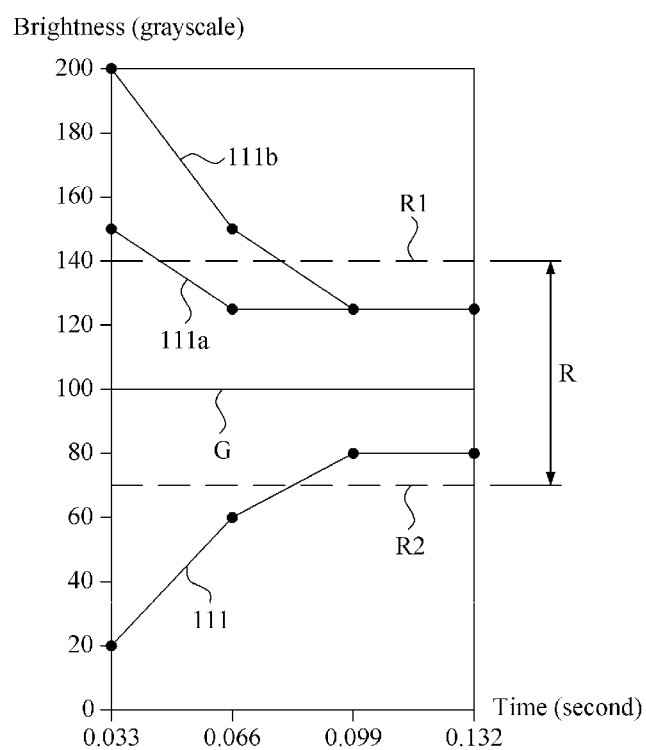
FIG. 3 is a line chart showing the relationship between the element parameters and the set reference value provided by using the dynamic panoramic image parameter adjustment system and the method thereof provided in accordance with the first embodiment of the present invention.
Figure 4:
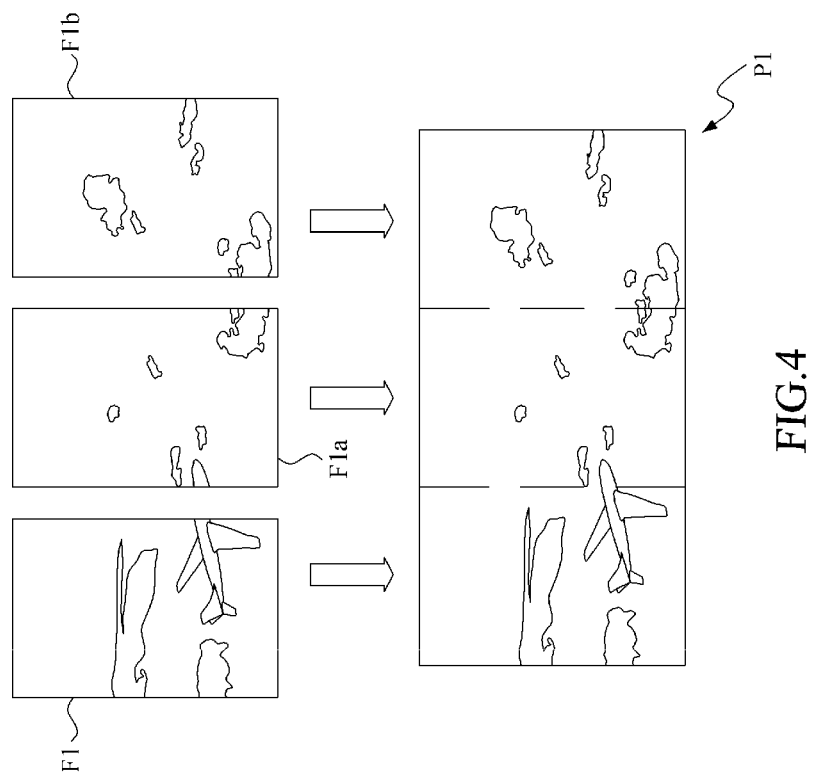
FIG. 4 is a schematic view showing the relationship between the first image captured at the first time point and the first panoramic image by using the dynamic panoramic image parameter adjustment system and the method thereof in accordance with the first embodiment of the present invention.
Figure 5:
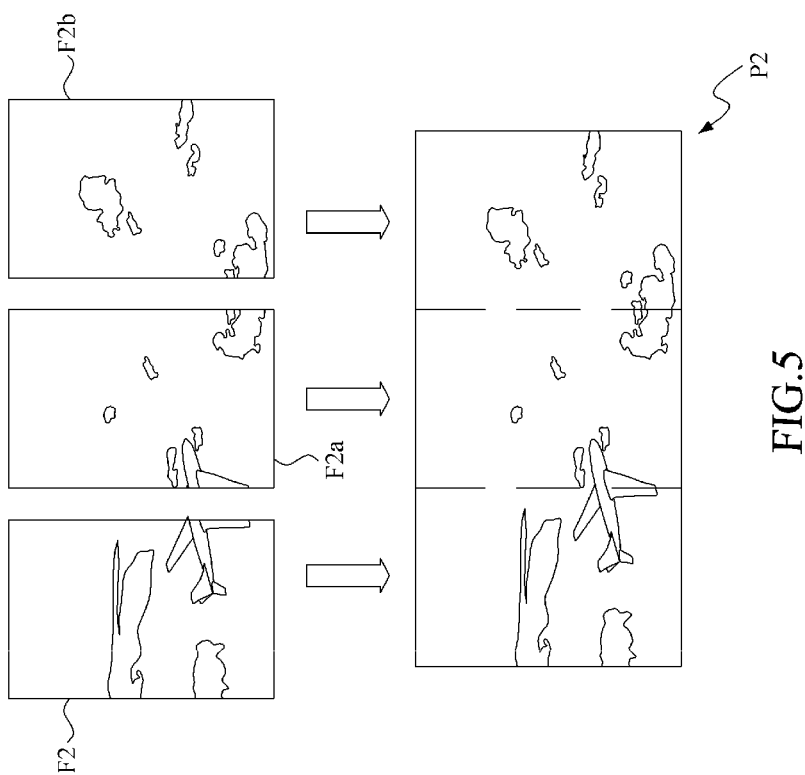
FIG. 5 is a schematic view showing the relationship between the second image captured at the second time point and the second panoramic image by using the dynamic panoramic image parameter adjustment system and the method thereof in accordance with the first embodiment of the present invention.

Please refer to FIG. 1 to FIG. 5, wherein FIG. 2 is a flow chart showing the dynamic panoramic image parameter adjustment method provided in accordance with the first embodiment of the present invention; FIG. 3 is a line chart showing the relationship between the element parameters and the set reference value provided by using the dynamic panoramic image parameter adjustment system and the method thereof provided in accordance with the first embodiment of the present invention; FIG. 4 is a schematic view showing the relationship between the first image captured at the first time point and the first panoramic image by using the dynamic panoramic image parameter adjustment system and the method thereof in accordance with the first embodiment of the present invention; and FIG. 5 is a schematic view showing the relationship between the second image captured at the second time point and the second panoramic image by using the dynamic panoramic image parameter adjustment system and the method thereof in accordance with the first embodiment of the present invention.

As shown, the first embodiment of the present invention provides a dynamic panoramic image parameter adjustment method. Firstly, three first images F1, F1a, F1b (the number of the first images are decided by the number of the image capture elements) each having an image parameter are captured by using the image capture elements 11, 11a, 11b at a first time point T1 within a consecutive time period, and the first parameter setting values of the image capture elements 11, 11a, 11b corresponding to the element parameters 111, 111a, 111b are also captured by using the parameter transmitting units 121, 121a, 121b at the first time point T1 (i.e. step S1).

The first parameter setting value can be a first brightness value (including the result of the exposure shutter time and the gain), a first image saturation setting value, a first image white balance setting value, a first image sharpness setting value, or a first image contrast setting value. In the present embodiment, the first parameter setting value is the first brightness value (including the result of the exposure shutter time and the gain). The element parameter is the brightness value (including the exposure shutter time and the gain). However, the present invention is not limited thereto. The first parameter setting value is the image parameter corresponding to the first image F1, F1a, F1b. In the present embodiment, take the image capture element 11 as an example, according to image parameter of the first image F1 captured by the image capture element at the first time point T1 of 0.033 second, the first parameter setting value of the element parameter 111 is 20. It is noted that, the first parameter setting values of the other element parameters 111a, 111b at the first time point can be the other values.

Thereafter, these three element compensation values are generated by the parameter processing unit 122 according to a product of a difference between a set target value and a first parameter setting value within a target setting range R and an adjustment ratio. It respectively compensates the element compensation value to the first parameter setting value to form three second parameter setting values (i.e. step S2), and then generates three parameter control signals C, Ca and Cb for controlling the image capturing elements 11, 11a and 11b according to the second parameter setting values. Wherein, the target setting range R is based on a set reference value G and the set reference value G may be an intermediate value of the target setting range R. However, the present invention is not limited thereto.

In the present embodiment, both the target setting value and the set reference value G are 100, an upper limit value R1 of the target setting range R is 140 and a lower limit value R2 of the target setting range R is 70, and the adjusting ratio is 50%. Take the image capture element 11 as an example, the difference between the first parameter setting value and the target setting value is 80, and thus the element compensation value is 40. It is noted that, in the present embodiment, the target setting value equals to the set reference value, but the present invention is not limited thereto. The target setting value can be any value within the target setting range R, and also can be modified based on the corresponding image parameter. In addition, the target setting values and the target setting ranges R of the image capture elements 11, 11a, 11b are not necessary to be the same.

Thereafter, the element compensation value is used to compensate the first parameter setting value, and the generated second parameter setting value is 60 such that the element parameter 111 would get closer to the target setting value G and the lower limit value R2 of the target setting range R. It is noted that, the adjusting ratio can be set according to the need of the user. The greater the adjusting ratio, the shorter the time needed for converging the element parameters 111, 111a, 111b to the target setting range R.

Please refer to Table 1 and FIG. 3, wherein Table 1 shows the change of the element parameters 111, 111a, 111b with respect to time. The target setting values of the image capture elements 11, 11a, 11b are 100, and all the corresponding adjusting ratios are 50%. As shown in Table 1, the element parameter 111 is 20 in the beginning and gradually gets closer to 100 as time goes by, the element parameter 111a is 150 in the beginning and gradually gets closer to 100 as time goes by, and the element parameter 111b is 200 in the beginning and gradually gets closer to 100 as time goes by.

TABLE 1

| Time (Second) | Element parameter 111 (Brightness) | Element parameter 111a (Brightness) | Element parameter 111b (Brightness) |
| --- | --- | --- | --- |
| 0.033 | 20 | 150 | 200 |
| 0.066 | 60 | 125 | 150 |
| 0.099 | 80 | 125 | 125 |

Then, the image capture elements 11, 11a, 11b set the second parameter setting values as the element parameters 111, 111a, 111b when receiving the parameter control signals C, Ca, Cb, and capture three second images F2, F2a, F2b at a second time point within the consecutive time period for generating a dynamic panoramic image together with the first images F1, F1a, F1b (i.e. step S3, and the number of the second images is decided by the number of the image capture elements). In the present embodiment, the second time point indicates the next capture time after the first time point T1, i.e. 0.066 second. In addition, because the second parameter setting value in compared with the first parameter setting value is closer to the target setting range R, the element parameters 111, 111a, 111b would get closer to the target setting value as time goes by. In the first embodiment, the converging time (from the beginning to the end of the compensation process) for the element parameters 111, 111a, 111b of each of the image capture elements 11, 11a, 11b may be different, and different element compensation values may be generated with respective to different image capture elements 11, 11a, 11b.

In practice, the parameter control signals C, Ca, Cb generated by the parameter processing module 12 are merely utilized for controlling exposure time and gain of the element parameters 111, 111a, 111b of the image capture elements 11, 11a, 11b. The other parameters such as white-balance, saturation, contrast and sharpness are arranged in the image processing pipeline of the parameter processing module 12 and the image processing module 13.

Then, the image processing module 13 stitches the first images F1, F1a, F1b to form a first panoramic image P1 at the first time point, stitches the second images F2, F2a, F2b to form a second panoramic image P2 at the second time point, and generates the dynamic panoramic image by aligning the first panoramic image P1 and the second panoramic image P2 in time order. Finally, the dynamic panoramic image is stored in the storage module 15, displayed by the display module 14, or transmitted to the other electronic devices by the wireless communication module 16.

Figure 6:
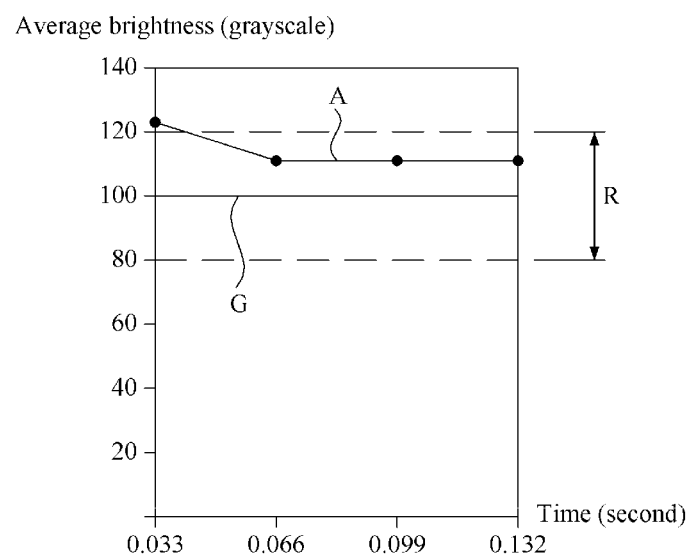
FIG. 6 is a line chart showing the relationship between the element parameters and the set reference value provided by using the dynamic panoramic image parameter adjustment system and the method thereof provided in accordance with a second embodiment of the present invention.

Please refer to Table 2 and FIG. 6, wherein FIG. 6 is a line chart showing the relationship between the element parameters and the set reference value provided by using the dynamic panoramic image parameter adjustment system and the method thereof provided in accordance with a second embodiment of the present invention. Furthermore, table 2 shows the second embodiment of the present invention. The average value A of the element parameters 111, 111a, 111b and the element parameters 111, 111a, 111b changes at each time. In the second embodiment, the average value A is the average brightness value, but the present invention is not limited thereto.

TABLE 2

| Time (Second) | Element parameter 111 (Brightness) | Element parameter 111a (Brightness) | Element parameter 111b (Brightness) | Average value A |
| --- | --- | --- | --- | --- |
| 0.033 | 20 | 150 | 200 | 123.33 |
| 0.066 | 8.3333333 | 138.3333333 | 188.3333333 | 111.6667 |
| 0.099 | 8.3333333 | 138.3333333 | 188.3333333 | 111.6667 |
| Target setting value | 100 | 100 | 100 | |

Most of the second embodiment is identical to the first embodiment, and the difference thereof is the parameter compensation value generated by the parameter processing unit 122. In the second embodiment, both the target setting value and the set reference value G are 100, an upper limit R1 of the target setting range R is 120, a lower limit R2 of the target setting range R is 80, and the adjusting ratio is 50%. In the second embodiment, the parameter processing unit 122 may calculates the average value A of the element parameter 111, the element parameter 111a, and the element parameter 111b first. At the time point of 0.033 second, the average value A is 123.33 (which is a repeating decimal rounded to the second decimal place, and so do the following values), which is not located in the target setting range R.

Thus, the parameter processing unit 122 calculates the difference between the average value A and the target setting value, i.e. −23.33, multiplies the aforementioned difference and the adjusting ratio to generate the parameter compensation value, i.e. −11.67, and uses the aforementioned parameter compensation value to compensate the element parameter 111, the element parameter 111a, and the element parameter 111b. As shown in Table 2, the average value A would get closer to the target setting value as time goes by, and the parameter processing unit 122 would stop generating the parameter compensation value as the average value A is located in the target setting range R. In the second embodiment, the average value A of the element parameter 111, the element parameter 111a, and the element parameter 111b at the time point of 0.066 second is 111.67, which is located in the target setting range R, and thus, the parameter processing unit 122 may stop generating the parameter compensation value even if the element parameter 111, the element parameter 111a, and the element parameter 111b are not located in the target setting range R.

The advantage of the second embodiment is that, when the average value A is located in the target setting value R, the parameter processing unit 122 may stop generating the parameter compensation value, i.e. stop compensating the element parameter 111, the element parameter 111a, and the element parameter 111b, such that the converging time (from the beginning to the end of the compensation process) of the element parameter 111, the element parameter 111a, and the element parameter 111b would be the same and the junction between the images capture by each of the image capture elements would be more smooth, and less vibration would be generated when shooting a moving object.

In practice, the second embodiment can be used together with the first embodiment. For example, if it is preferred to compensate the element parameters even if the average value A has been located in the target setting range R, the user may use the parameter processing module 12 to do the parameter calculation and compensate the element parameter 111, the element parameter 111a, and the element parameter 111b individually.

In sum, the dynamic panoramic image parameter adjustment system and the method thereof provided in the present invention set the element parameters of the plurality of the image capture elements as the first parameter setting values at the first time point, and uses the image capture elements to capture a plurality of first images. The parameter transmitting units may capture the first parameter setting values respectively. The parameter processing unit may do some specific calculation based on the first parameter setting values, multiply the calculated result and the adjusting ratio to form the element compensation values, and compensate the first parameter setting values by using the element compensation values to generate the second parameter setting values so as to generate the parameter control signals according to the second parameter setting values.

After receiving the parameter control signal, the image capture elements may adjust the element parameter based on the parameter control signal and capture the second images utilized for forming the dynamic panoramic image together with the first images. Because the shooting angles of each of the image capture elements are different. The image parameters with respect to each of the image capture elements would be also different. In order to keep the differentiation of the image parameters but have the element parameters of the image capture elements or the average value of the element parameters getting closer to the set reference value, the element parameters of the image capture elements or the average value of the element parameters would get closer to the target setting value within the target setting range with the set reference value as the middle value of the target setting range.

In compared with the prior art, because the parameter processing unit of the dynamic panoramic image parameter adjustment system and the method thereof provided in accordance with the preferred embodiment of the present invention may generate the parameter control signals to adjust the element parameters of the image capture elements, the element parameters of the image capture elements would be adjusted based on the second parameter setting value such that the image capture element would be capable to capture the detail of the image to prevent the drawback of the prior art technology which can only adjust the image in post-production and fails to show the image detail missed in the original image.

In addition, since the image processing unit compensates the first parameter setting value according to the difference between the target setting value and the first parameter setting value (or the average of the first parameter setting value) multiplied by adjustment ratio, so as to generate the second parameter setting values. Therefore, the average value of the second parameter setting value or the second parameter setting value gradually approaches the target setting range as time goes on, so as to avoid the discomfort feeling resulted from excessively large change when watching the dynamic panoramic image.

While the present invention has been particularly shown and described with reference to a preferred embodiment, it will be understood by those skilled in the art that various changes in form and detail may be without departing from the spirit and scope of the present invention.

What is claimed is:

1. A dynamic panoramic image parameter adjustment system, comprising:
    a plurality of image capture elements, corresponding to a plurality of element parameters respectively, utilized for capturing a plurality of first images at a first time point in a consecutive time period, each first image having an image parameter, wherein at the first time point, the element parameters are a plurality of first parameter setting values corresponding to the image parameters of the first images; and
    a parameter processing module, electrically connected to the image capture elements, utilized for calculating a plurality of element compensation values with respective to the image capture elements respectively based on the first parameter setting values of the image capture elements and a plurality of target setting values within a target setting range on a basis of a set reference value so as to compensate the first parameter setting value by using the element compensation values respectively to fonn a plurality of second parameter setting values, and generating a plurality of parameter control signals for controlling the image capture elements respectively based on the second parameter setting values;
    wherein, as the image capture elements receive the parameter control signals, the image capture elements use the second parameter setting values as the element parameters at a second time point in the consecutive time period which is later than the first time point, and capture a plurality of second images for forming a dynamic panoramic image within the consecutive time period together with the first images; and
    wherein the parameter processing module generates the element compensation values by multiplying a difference between the target setting values and the first parameter setting values and an adjusting ratio, so as to compensate the first parameter setting values by using the element compensation values to form the second parameter setting values.

2. The dynamic panoramic image parameter adjustment system of claim 1, wherein the set reference value is a middle value of the target setting range.

3. The dynamic panoramic image parameter adjustment system of claim 1, further comprising an image processing module, electrically connected to the image capture elements for receiving the first images and the second images, so as to form a first panoramic image at the first time point by using the first images and a second panoramic image at the second time point by using the second images respectively, and forming the dynamic panoramic image according to the first panoramic image and the second panoramic image.

4. The dynamic panoramic image parameter adjustment system of claim 1, wherein the parameter processing module comprises:
   a plurality of parameter transmitting units, electrically connected to the image capture elements respectively for capturing the first parameter setting values; and
   a parameter processing unit, electrically connected to the parameter transmitting units, for calculating the element compensation values according to the first parameter setting values and the target setting values, so as to compensate the first parameter setting values by using the element compensation values to form the second parameter setting values, and generating the parameter control signals according to the second parameter setting values.

5. The dynamic panoramic image parameter adjustment system of claim 1, wherein, the element parameter is an image brightness parameter including a result of an exposure shutter value and gain values, an image saturation parameter, an image white balance parameter, an image contrast parameter, or an image sharpness parameter.

6. The dynamic panoramic image parameter adjustment system of claim 1, wherein each of the image capture elements is a complementary metal-oxide-semiconductor (CMOS) image capture element.

7. A dynamic panoramic image parameter adjustment method, utilized for controlling the dynamic panoramic image parameter adjustment system of claim 1, comprising:
   (a) capturing the first images and capturing the first parameter setting values corresponding to the image parameters of the first images respectively at the first time point;
   (b) calculating the element compensation values according to the first parameter setting values and the target setting values, and compensating the first parameter setting values by using the element compensation values to form the second parameter setting values; and
   (c) setting the second parameter setting values as the element parameters at the second time point, and capturing the second images for forming the dynamic panoramic image together with the first images,
   wherein the step (b) is to multiply a difference between the target setting value and the first parameter setting values and an adjusting ratio to generate the element compensation values, and compensate the first parameter setting values by using the element compensation values to form the second parameter setting values.

8. A dynamic panoramic image parameter adjustment system, comprising:
   a plurality of image capture elements, corresponding to a plurality of element parameters respectively, utilized for capturing a plurality of first images at a first time point in a consecutive time period, each first image having an image parameter, wherein at the first time point, the element parameters are a plurality of first parameter setting values corresponding to the image parameters of the first images; and
   a parameter processing module, electrically connected to the image capture elements, utilized for calculating a plurality of element compensation values with respective to the image capture elements respectively based on the first parameter setting values of the image capture elements and a plurality of target setting values within a target setting range on a basis of a set reference value so as to compensate the first parameter setting value by using the element compensation values respectively to form a plurality of second parameter setting values, and generating a plurality of parameter control signals for controlling the image capture elements respectively based on the second parameter setting values;
   wherein, as the image capture elements receive the parameter control signals, the image capture elements use the second parameter setting values as the element parameters at a second time point in the consecutive time period which is later than the first time point, and capture a plurality of second images for forming a dynamic panoramic image within the consecutive time period together with the first images; and
   wherein the parameter processing module generates the element compensation values by multiplying a difference between the target setting values and an average value of the first parameter setting values and an adjusting ratio, so as to compensate the first parameter setting values by using the element compensation values to form the second parameter setting values.

9. The dynamic panoramic image parameter adjustment system of claim 8, wherein the set reference value is a middle value of the target setting range.

10. The dynamic panoramic image parameter adjustment system of claim 8, further comprising an image processing module, electrically connected to the image capture elements for receiving the first images and the second images, so as to form a first panoramic image at the first time point by using the first images and a second panoramic image at the second time point by using the second images respectively, and forming the dynamic panoramic image according to the first panoramic image and the second panoramic image.

11. The dynamic panoramic image parameter adjustment system of claim 8, wherein the parameter processing module comprises:
    a plurality of parameter transmitting units, electrically connected to the image capture elements respectively for capturing the first parameter setting values; and
    a parameter processing unit, electrically connected to the parameter transmitting units, for calculating the element compensation values according to the first parameter setting values and the target setting values, so as to compensate the first parameter setting values by using the element compensation values to form the second parameter setting values, and generating the parameter control signals according to the second parameter setting values.

12. The dynamic panoramic image parameter adjustment system of claim 8, wherein, the element parameter is an image brightness parameter including a result of an exposure shutter value and gain values, an image saturation parameter, an image white balance parameter, an image contrast parameter, or an image sharpness parameter.

13. The dynamic panoramic image parameter adjustment system of claim 8, wherein each of the image capture elements is a complementary metal-oxide-semiconductor (CMOS) image capture element.

\* \* \* \* \*